US007890655B2

(12) United States Patent
Chandrasekaran

(10) Patent No.: US 7,890,655 B2
(45) Date of Patent: Feb. 15, 2011

(54) STORAGE AREA NETWORK PORT BASED DATA TRANSFER ACCELERATION

(75) Inventor: Varagur Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 11/356,881

(22) Filed: Feb. 16, 2006

(65) Prior Publication Data

US 2007/0192433 A1    Aug. 16, 2007

(51) Int. Cl.
*G06F 13/14*    (2006.01)

(52) U.S. Cl. .................. 709/238; 709/242; 709/237; 711/155; 711/156

(58) Field of Classification Search ................. 709/238, 709/242, 237; 711/155, 156
See application file for complete search history.

(56) References Cited

U.S. PATENT DOCUMENTS

| 6,633,548 | B2 * | 10/2003 | Bachmutsky et al. ....... 370/255 |
| 6,757,767 | B1 * | 6/2004 | Kelleher ..................... 710/107 |
| 7,185,062 | B2 * | 2/2007 | Lolayekar et al. ........... 709/213 |
| 7,219,158 | B2 * | 5/2007 | Border et al. ............... 709/240 |
| 7,286,476 | B2 * | 10/2007 | Helmy et al. ............ 370/230.1 |
| 7,389,462 | B1 * | 6/2008 | Wang et al. .................. 714/748 |
| 2003/0084209 | A1 * | 5/2003 | Chadalapaka .................. 710/5 |
| 2003/0185154 | A1 * | 10/2003 | Mullendore et al. ......... 370/230 |
| 2004/0049564 | A1 * | 3/2004 | Ng et al. ..................... 709/223 |
| 2006/0036821 | A1 * | 2/2006 | Frey et al. ................... 711/162 |
| 2006/0104269 | A1 * | 5/2006 | Perozo et al. ............... 370/389 |
| 2006/0126520 | A1 * | 6/2006 | Nambiar et al. ............. 370/248 |
| 2006/0262784 | A1 * | 11/2006 | Cheethirala et al. ......... 370/389 |
| 2007/0088795 | A1 * | 4/2007 | Dunbar ....................... 709/217 |
| 2007/0115966 | A1 * | 5/2007 | Tzeng ......................... 370/389 |

OTHER PUBLICATIONS

Cisco Systems, Inc., Intelligent Fabric Applications, "Fibre Channel Write Acceleration", Cisco white paper, 2005, 9 pages.

* cited by examiner

*Primary Examiner*—Kevin Bates
(74) *Attorney, Agent, or Firm*—Weaver Austin Villeneuve and Sampson LLP

(57) ABSTRACT

According to the present invention, methods and apparatus are provided for improving data transfers between hosts and targets connected through fiber channel switches. A host connected intelligent port and a target connected intelligent port associated with fiber channel edge switches are configured to snoop frames from the host and target and establish flows for acceleration. The host connected intelligent port and the target connect intelligent port preemptively respond to host and target transmissions to reduce data transfer latency.

21 Claims, 7 Drawing Sheets

Figure 4

| Initiator 401 | Target 403 | Logical Unit Number 405 | Write Acceleration 407 |
|---|---|---|---|
| Host 411 | Disk Array 413 | LUN 415 | Enabled 417 |
| Host 421 | Tape Drive 423 | LUN 425 | Disabled 427 |
| ... | ... | ... | ... |
| Wildcard 441 | Wildcard 443 | Wildcard 445 | Wildcard 447 |

STORAGE AREA NETWORK PORT BASED DATA TRANSFER ACCELERATION

BACKGROUND OF THE INVENTION

1. Field of the Invention

The present invention generally relates to Storage Area Networks (SANs). More specifically, the present invention provides techniques and mechanisms for allowing improved data transfer efficiency for hosts and targets connected to SANs.

2. Description of Related Art

Storage Area Networks (SANs) provide an effective mechanism for maintaining and managing large amounts of data. A host can obtain data from a device such as a tape device through a fibre channel fabric having a number of fibre channel switches. However, storage area networks are often limited in geographic scope. Fibre channel fabrics in different geographic areas or separate fibre channel fabrics often have limited ability to interoperate.

Protocols such as Fibre Channel over the Internet Protocol (FCIP) allow devices on different fibre channel fabrics to communicate. FCIP is one protocol that allows the creation of a wide area network (WAN) connecting hosts and tape resources. For example, two separate fibre channel fabrics may be connected through an IP network. A host device on a first fibre channel fabric can read data from a device on a second fibre channel fabric through the IP network. However, reading data over an IP network from a separate fibre channel network can often be inefficient. Round trip times for commands and data can often introduce high latency into various storage applications, such as applications involving bulk data transfers or tape backup operations. Some limited acceleration mechanisms are available for improving data transfer efficiency. However, configuration and management of existing acceleration mechanisms are involved and complicated.

Consequently, it is desirable to provide improved techniques for allowing efficient and effective transfer of data between SAN hosts and targets.

SUMMARY OF THE INVENTION

According to the present invention, methods and apparatus are provided for improving data transfers between hosts and targets connected through fibre channel switches. A host connected intelligent port and a target connected intelligent port associated with fibre channel edge switches are configured to snoop frames from the host and target and establish flows for acceleration. The host connected intelligent port and the target connected intelligent port preemptively respond to host and target transmissions to reduce data transfer latency.

In one embodiment, a storage area network device is provided. The storage area network device includes a host intelligent port and a processor. The host intelligent port is operable to snoop a command frame from a host. The processor is operable to identify a flow between the host and a target based on the snooped command frame and determine that the target is associated with a target intelligent port that supports acceleration. The storage area network device is operable to enable acceleration between the host and the target by preemptively responding to the host with a transfer ready when the host sends a data transfer request.

In another embodiment, a technique for accelerating storage area network data transfers is provided. A command frame from a host is snooped at a host intelligent port associated with a storage area network edge switch. A flow between the host and a target based on the snooped command frame is identified. It is determined that the target is associated with a target intelligent port that supports acceleration. Acceleration between the host and the target is enabled by preemptively responding to the host with a transfer ready when the host sends a data transfer request.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 4 is a diagrammatic representation of a TCAM table.

DETAILED DESCRIPTION OF SPECIFIC EMBODIMENTS

Figure 1:
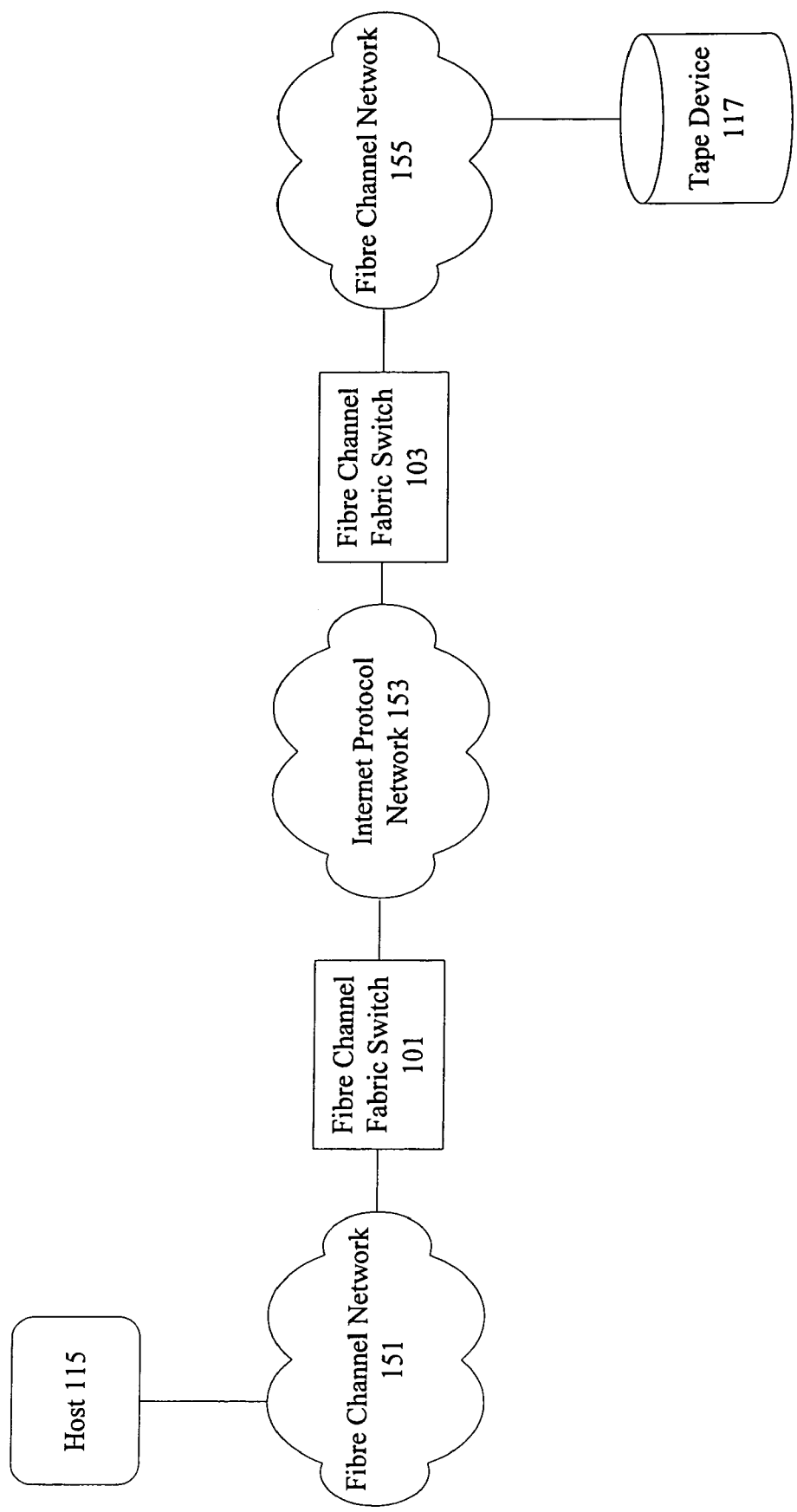
FIG. 1 is a diagrammatic representation showing a system that can use the techniques of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of storage area networks and particular control messages. However, it should be noted that the techniques of the present invention can be applied to a variety of different standards and variations to storage area networks and particular control messages. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. In addition, a block of data is described in several contexts. A block of data may include multiple data blocks or data sets.

Hosts and target storage devices are often connected over storage area networks. In some examples, however, the host and the remote storage devices are associated with storage area networks that are connected over a wide area network (WAN) that introduces substantial latency into communications between the devices. Hence the latency introduced by a wide area network (WAN) can make storage backup restore applications and bulk data transfer operations highly inefficient for such systems.

Some mechanisms such as write acceleration can be used to decrease data transfer latency. In one example, a host is connected to a target storage device through at least a host end fibre channel switch and a target storage device end fibre channel switch. Any switch located near a host is referred to herein as a host end fibre channel switch. Any port connected to the host is referred to herein as a host end port. Any switch located near a target storage device is referred to herein as a target end fibre channel switch. Any port connected to the target is referred to herein as a target end port. However, mechanisms such as write acceleration require complex configuration of flows including initiator target pairs or initiator target and logical unit number triplets. Operation is interrupted if a host or a target moves.

Consequently, the techniques of the present invention no longer make acceleration host, target, or switch-centric. Instead, acceleration is made port-centric. A host end port or a target end port associated with a storage area network edge switch is configured to automatically snoop frames and establish flows upon determining that host end ports and target end ports support acceleration. According to various embodiments, the host end port and the target end port are intelligent ports associated with intelligent line cards that have the capability to determine flow information. A host end port and a target end port that are implemented on intelligent line cards are referred to herein as a host end intelligent port (HI-port) and a target end intelligent port (TI-port). A host end port with acceleration and a target end port with acceleration that are implemented on intelligent line cards are referred to herein as a host end intelligent port with acceleration (HIA-port) and a target end intelligent port with acceleration (TIA-port). Any given port associated with an edge switch may be both an HI-port and a TI-port or an HIA-port and a TIA-port. Flow control mechanisms are implemented to decrease the likelihood of buffer overflow or underflow at HIA and TIA-ports.

FIG. 1 is a diagrammatic representation showing one example of a system that can use the techniques of the present invention. Although the techniques of the present invention are particularly applicable to wide area networks (WANs) that use acceleration, the techniques of the present invention can also be applied to geographically concentrated networks as a mechanism for automatically configuring flows. A WAN based storage area network often includes multiple networks. In one example, multiple fibre channel networks are often interconnected through widely available Internet protocol (IP) networks such as the Internet. For example, fibre channel network 151 is connected to Internet protocol network 153 using a fibre channel fabric switch 101. In one example, switch 101 is a host end switch and switch 103 is a tape device end switch. The fibre channel fabric switch 101 includes a fibre channel interface as well as an Internet protocol interface. Fibre channel network 155 is also connected to Internet protocol network 153 through a fibre channel fabric switch 103. The fibre channel fabric switch 103 also includes a fibre channel network interface and an Internet protocol interface. The host 115 is connected to fibre channel network 151 and target storage device 117 such as a tape device or disk array is connected to fibre channel network 155.

In one example, a host 115 sends commands to a target device 117 through the fibre channel network 151, the Internet protocol network 153, and the fibre channel network 155. According to various embodiments, the fibre channel fabric switch 101 establishes a tunnel through the Internet protocol network 153 with fibre channel fabric switch 103. Fibre channel fabric switches 101 and 103 are referred to herein as tunnel end points.

However, sending commands and data through multiple networks such as fibre channel network 151, an Internet protocol network 153, and a fibre channel network 155 can cause high latency and poor round trip times. A host 115 would not be able to efficiently write data to or read data from a target device 117. In a standard such as SCSI (Small Computer Systems Interface) stream commands for target devices, only one command can be issued at a time. For each command to complete, the host 115 needs to first receive a response from the target device 117. For example, in order for a host to issue multiple read commands for multiple blocks of data, the host must wait for the data and status messages from a target device for the first read command to be received before the host can send a second read command. This wait can cause a delay of at least one round trip time for every command.

In one example, a fibre channel fabric switch 103 preemptively or anticipatorily sends a read command to a target device 117 as soon as a status response is returned from a target device 117 for the previous read. For example, a fibre channel fabric switch 103 can send a read command as soon as it is determined that the host is in streaming mode. Instead of waiting for additional read commands from a host 115, data is anticipatorily read by switch 103 and buffered at a switch 101 so that the switch 101 can rapidly respond to expected subsequent read requests from the host 115.

However, in order to allow acceleration of reads or writes, complex configuration and setup of flows including initiator target pairs or initiator target LUN triplets are required. Operation may also be interrupted if a host or target moves. Consequently, the techniques of the present invention provide mechanisms for automatically detecting flows and establishing flows on a port centric basis.

Figure 2:
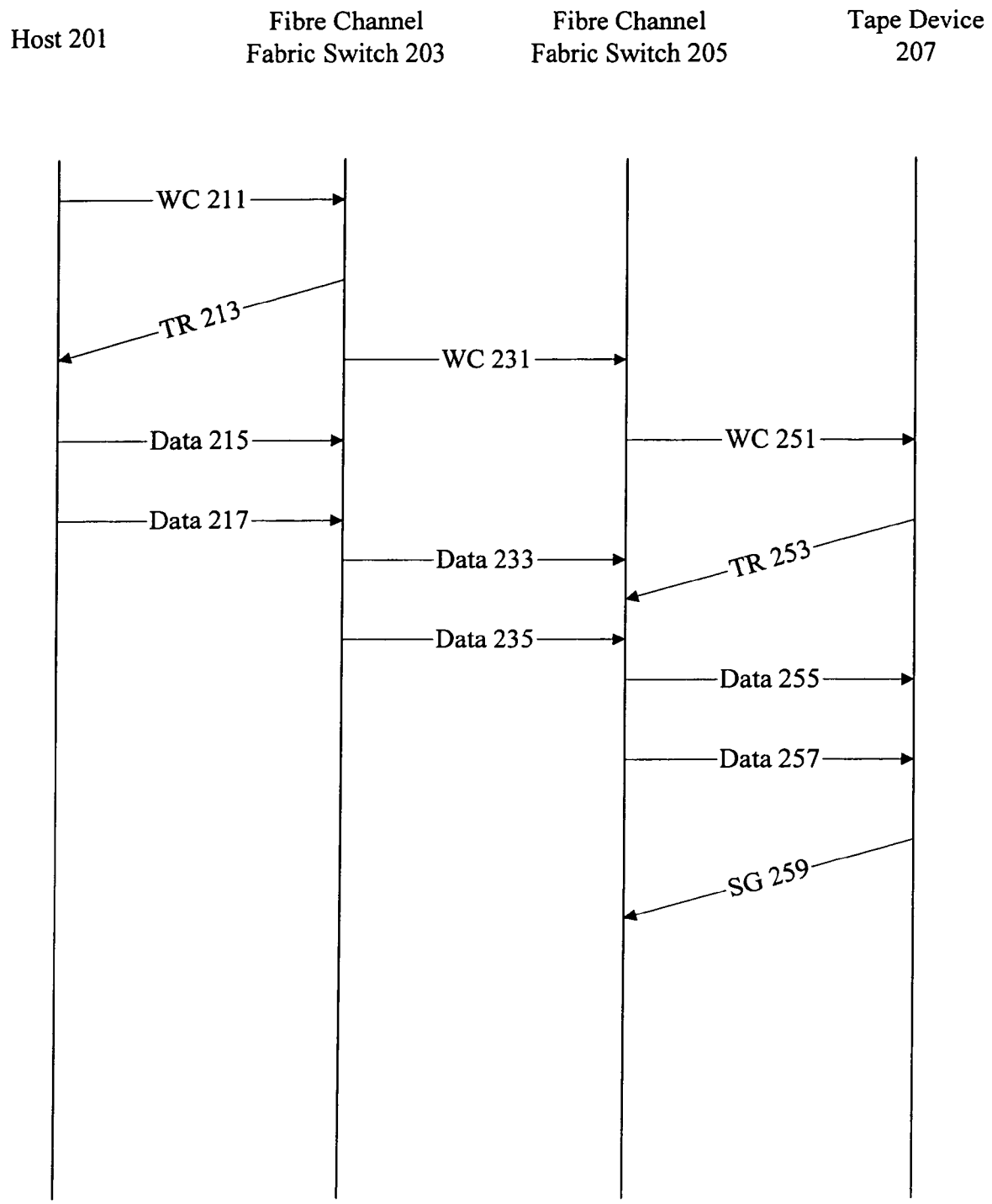
FIG. 2 is an exchange diagram showing a write transaction.

FIG. 2 is an exchange diagram showing one example of acceleration that can be used once flows are configured and established. A host 201 sends a write command 211 to a fibre channel fabric switch 203. According to various embodiments, fibre channel fabric switches 203 and 205 are gateways between fibre channel and IP networks. The fibre channel fabric switches 203 and 205 serve as fibre channel over IP (FCIP) tunneling endpoints. The fibre channel fabric switch 203, instead of waiting for a transfer ready from a target device 207, preemptively sends a transfer ready 213 to the host 201. The fibre channel fabric switch 203 also forwards the write command 231 to a fibre channel fabric switch 205.

The host 201, upon receiving the transfer ready 213, begins sending data 215 and data 217 to the fibre channel fabric switch 203. Data 215 and 217 can be sent to the fibre channel fabric switch 205 even before the write command 251 is received by the target device 207. According to various embodiments, fibre channel fabric switch 205 is responsible for forwarding a write command 251 to the target device 207 and receiving a transfer ready 253 before forwarding data 233 and 235 as data 255 and 257. A status good message 259 is then sent by the target device 207.

Figure 3:
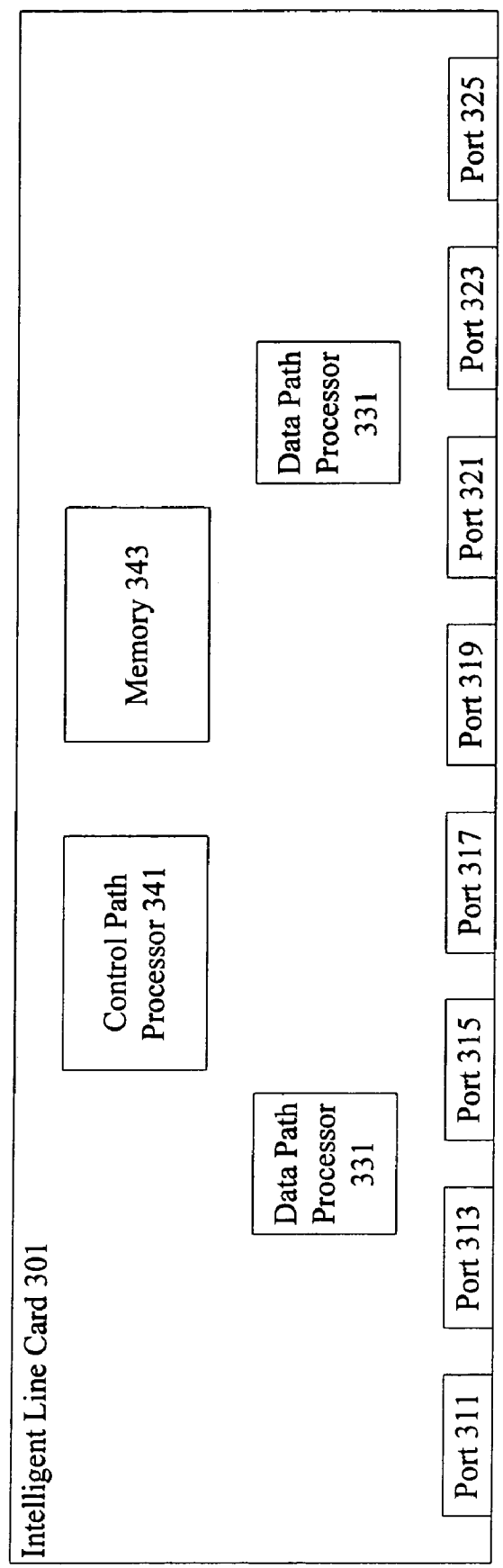
FIG. 3 is a diagrammatic representation showing an intelligent line card associated with an intelligent port.

Data transfer acceleration can be configured at intelligent ports connected to hosts and endpoints. FIG. 3 is a diagrammatic representation of one example of an intelligent line card having intelligent ports. According to various embodiments, the intelligent line card includes ports 311-325, data path processors 331 and 333, control path processor 341, and memory 343. Data path processors 331 and 333 are used to identify flow information and exchange information and output the data to the appropriate fibre channel switch port. The control path processor 341 is used to handle management functions and exceptions. Memory 343 can be used to hold statistical data gathered by a data path processor. In one embodiment, 8 data path processors are provided for 32 ports.

Although separate data path and control path processors are provided, it should be noted that in some instances, a single processor may be used to handle network traffic and control functions and exceptions. In other examples, additional processors may be provided. Any line card having hardware support for fibre channel packet snooping is referred to herein as an intelligent line card.

According to various embodiments, line cards snoop traffic from hosts in order to establish flows for acceleration. In one example, FCP_write_command frames are snooped in order to set up a flow including an initiator, target, and LUN grouping.

FIG. 4 is a diagrammatic representation showing a forwarding table or a Ternary Content Addressable Memory (TCAM) table that can be used to manage flows for acceleration. The TCAM table includes initiator 401, target 403, logical unit number (LUN) 405, and acceleration enable fields. In one example, a write acceleration enable field 407 is provided. In other examples, read acceleration can similarly be provided or a single field may encompass both. One entry includes a host 411 as an initiator, a disk array 413 as a target, LUN 415, and write acceleration enabled 417. Another entry includes host 421 as an initiator, a tape driver 423 as a target, LUN 425, and write acceleration disabled 427. An entry including wildcards 441, 443, 445, and 447 is used to trap initial command frames in order to set up a particular flow. According to various embodiments, once an initial command frame has been trapped, a flow with more detailed information such as specific host, target, and LUN identifiers is added to the table. A variety of other field may also be included in the TCAM table.

Figure 5:
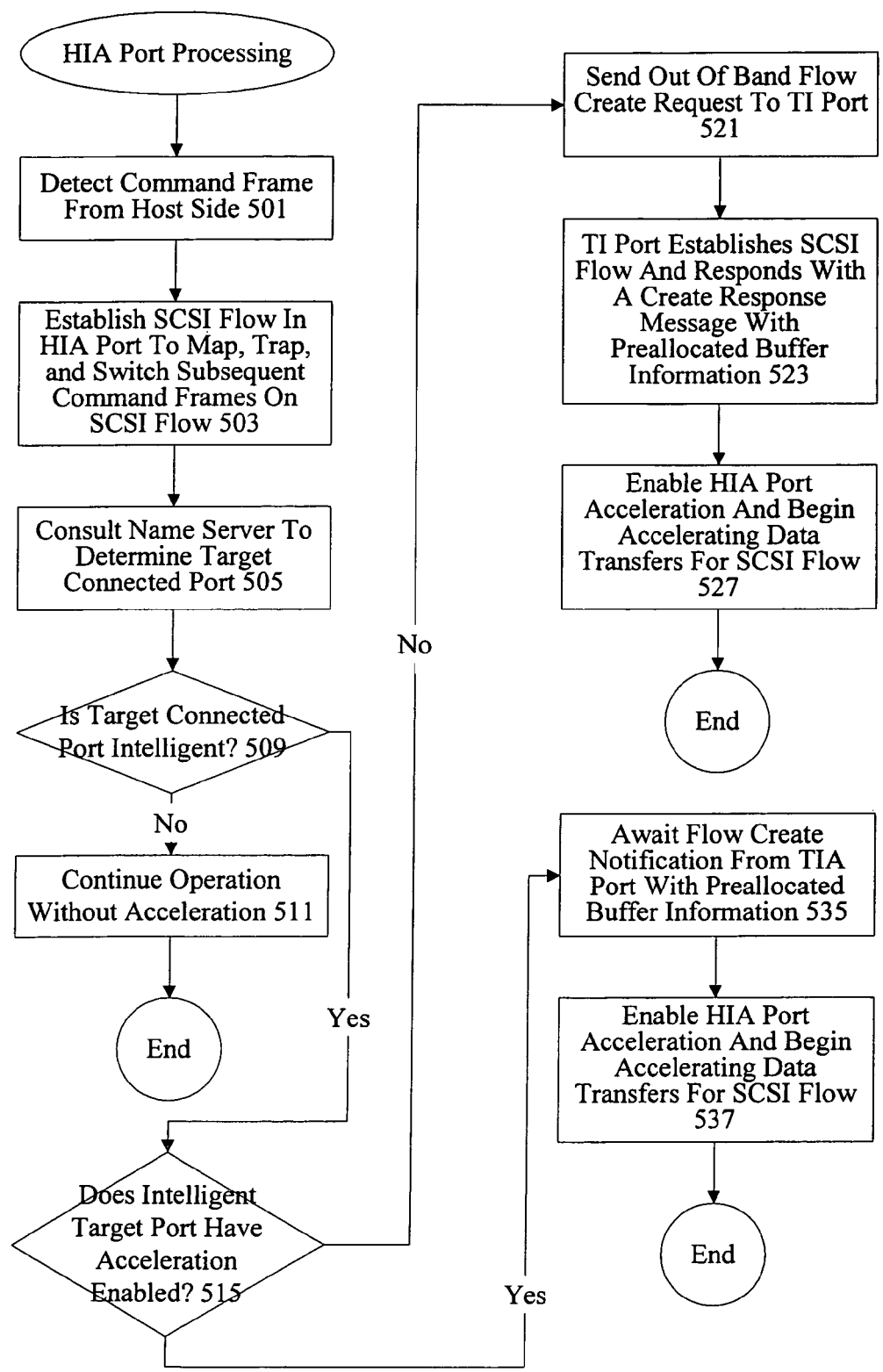
FIG. 5 is a flow process diagram showing operation associated with a host intelligent port with acceleration.

FIG. 5 is a flow process diagram showing operation at a host end intelligent port. It should be noted that any given intelligent port at the edge of a SAN can be configured either as an HIA-port, a TIA-port, or both. According to various embodiments, an HIA-port associated with an intelligent line card would set up a wild-card TCAM-entry to snoop FCP_CMND frames coming from an initiator or front panel side. A TIA-port would set up a wild-card TCAM-entry to snoop fibre channel protocol command (FCP_CMND) frames coming from the switch fabric side. For an I-port that is configured both as HIA-port & TIA-port, wild-card TCAM-entries would be set up to snoop FCP_CMND frames from both the front panel and the switch fabric side.

At 501, an HIA-port detects the first command frame, e.g. FCP_CMND, coming from the front panel side associated with a particular flow. According to various embodiments, an exact-match SCSI-Flow is set-up at the HIA-port for the applicable {Initiator, Target} pair to map, trap, and switch subsequent FCP_CMNDs on that SCSI-Flow at 503. The SCSI-Flow is kept in an acceleration disabled state so that snooped FCP_CMNDs continue to be switched towards the target without acceleration until the appropriate SCSI-Flow is established at the target end port. At 505, the HIA-port consults a name-server to determine the location and type of the target end port. At 509, it is determined if the target connected port is intelligent. If the target end port is not intelligent, operation continues without acceleration 511. However, if the target connected port is intelligent, i.e., the target connected port is a TI or a TIA port, it is determined at 515 if the intelligent target port has acceleration enabled.

If the intelligent port does not have acceleration enabled, the HIA attempts to enabled acceleration at the target end port. At 521, the HIA-port would send an out-of-band SCSI-Flow-Create-Request to the TI-port. At 523, the TI-port would establish an applicable SCSI-Flow by creating an exact-match TCAM-entry for the associated {Initiator, Target} pair and respond to HIA-port with an out-of-band SCSI-Flow-Create-Response message. According to various embodiments, the response would also carry the amount of buffers pre-allocated on the TI-port for this SCSI-Flow and loaned to the HIA-port for use during acceleration operations. At 527, on receiving a SCSI-Flow-Create-Response from the TI-port, the HIA-port would enable acceleration on the SCSI-Flow and start accelerating data transfers for the SCSI flow.

If it is determined that the intelligent target port already has acceleration enabled, the HIA-port waits for the TIA-port to initiate a SCSI-Flow-Create-Notification at 535 since the TIA-port would already be set to snoop all FCP_CMNDs from the switch fabric side. The notification would also carry the number of buffers pre-allocated on the TIA-port for this SCSI-Flow and loaned to the HIA-port for use during acceleration operations. On receiving the SCSI-Flow-Create-Notification out-of-band message from the TIA-port, the HIA-port would enable acceleration, in one example write acceleration, on the corresponding SCSI-Flow and start accelerating data transfers for the SCSI-Flow.

Figure 6:
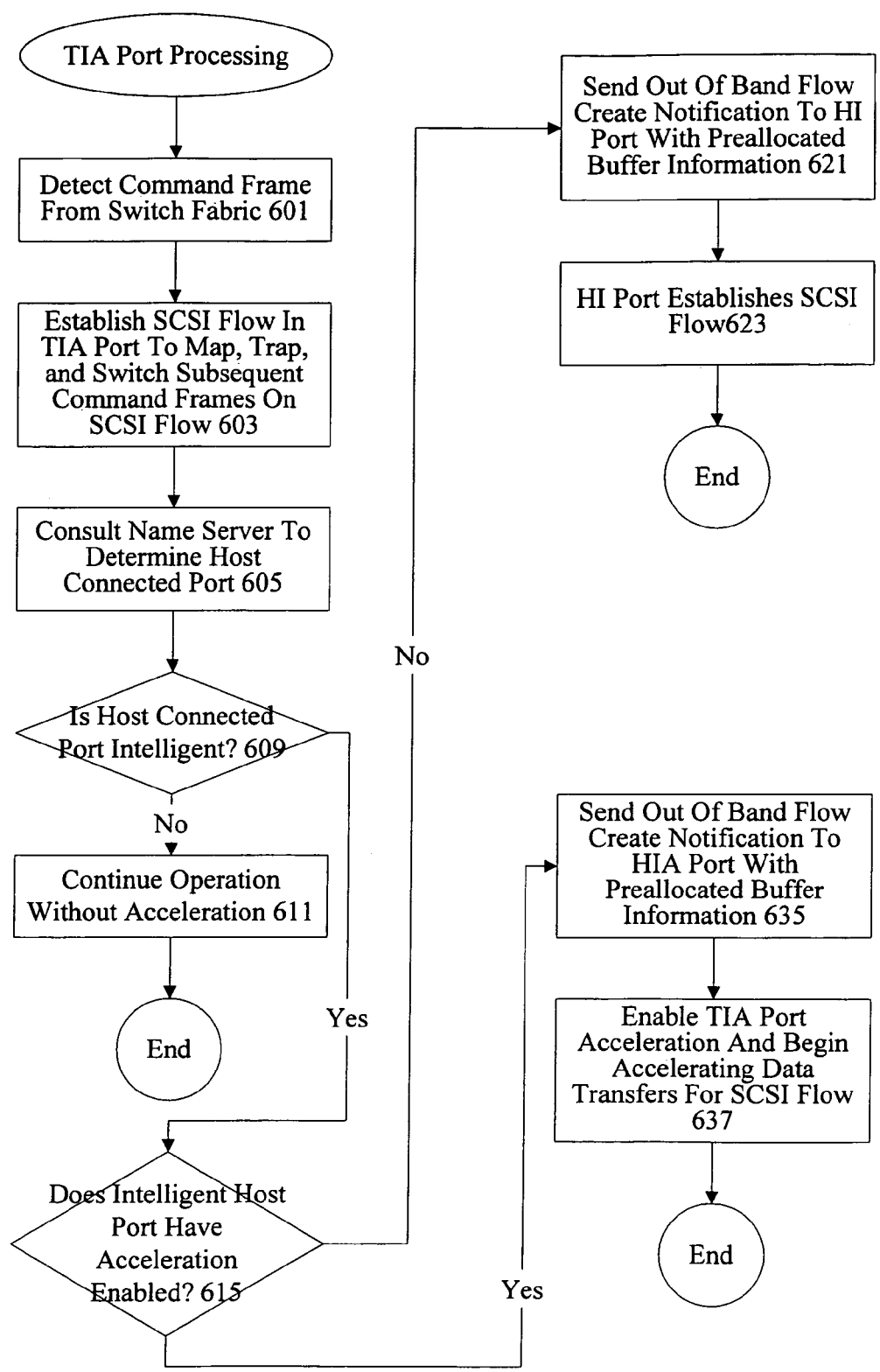
FIG. 6 is a flow process diagram showing operation associated with a target intelligent port with acceleration.

FIG. 6 is a flow process diagram showing operation at a target end intelligent port. It should be noted that any given intelligent port at the edge of a SAN can be configured either as an HIA-port, a TIA-port, or both. According to various embodiments, a TIA-port would set up a wild-card TCAM-entry to snoop fibre channel protocol command (FCP_CMND) frames coming from the switch fabric side. For an I-port that is configured both as HIA-port & TIA-port, wild-card TCAM-entries would be set up to snoop FCP_CMND frames from both the front panel and the switch fabric side.

At 601, a TIA-port detects the first command frame, e.g. FCP_CMND, coming from the switch fabric side associated with a particular flow. According to various embodiments, an exact-match SCSI-Flow is set-up at the TIA-port for the applicable {Initiator, Target} pair to map, trap, and switch subsequent FCP_CMNDs on that SCSI-Flow at 603. At 605, the TIA-port consults a name-server to determine the location and type of the host end port. At 609, it is determined if the host connected port is intelligent. If the host end port is not intelligent, operation continues without acceleration 611. However, if the host connected port is intelligent, i.e., the host connected port is an HI or an HIA port, it is determined at 615 if the intelligent host port has acceleration enabled.

If the intelligent port does not have acceleration enabled, the TIA port attempts to enable acceleration at the host end port. At 621, the TIA-port sends an out-of-band SCSI-Flow-Create-Notification to the HI-port. According to various embodiments, the message would also carry the amount of buffers pre-allocated on the TI-port for this SCSI-Flow and loaned to the HIA-port for use during acceleration operations. At 623, the HI-port would establish an applicable SCSI-Flow by creating an exact-match TCAM-entry for the associated {Initiator, Target} pair.

If it is determined that the intelligent host port already has acceleration enabled, then the HIA port would already have created an applicable exact-match SCSI-Flow since the FCP_CMND would have passed through the host connected port before arriving at the target connected port. In this case, the TIA-port sends an out-of-band SCSI-Flow-Create-Notification to the HIA-port at 635. The HIA-port would then enable Write-Acceleration on the concerned SCSI-Flow and start accelerating data transfers for the SCSI-Flow at 637.

According to various embodiments, buffer management and flow control mechanisms are also provided to prevent buffer underflow and overflow. In one example, a port may determine that a buffer increase is needed. In one example, a buffer increase is needed when host end buffer reach 80% utilization. When an HI-port/HIA-port runs low on TI-port/TIA-port supplied buffers that are provided for a given SCSI-Flow, the HI-port/HIA-port sends a BUFFER_INCREASE_REQUEST as an out-of-band message to the TI-port/TIA-port. The TI-port/TIA-port either responds with a BUFFER_INCREASE_SUCCESS if it can allocate and provide more buffer to the SCSI-Flow or it responds with a BUFFER_INCREASE_FAILURE if no more buffers can be allocated. If the response is a success, the HI-port/HIA-port uses the additional buffers for accelerating flow traffic.

In other examples, a port may determine that it has too many buffers. In this case, the host end port can notify the target end port to allow the target end port to allocate the buffers to other entities or flows. In one example, an HI-port/HIA-port finds low traffic activity on a given SCSI-Flow over a prolonged (programmable) duration, e.g. 20% utilization over a matter of hours. In this case, the pre-allocated TI-ports are dormant and unused for that SCSI-Flow. The HI-port/HIA-port can send a BUFFER_DECREASE_NOTIFICATION as an out-of-band message to the TI-port/TIA-port. Upon receiving this notification, the TI-port/TIA-port frees the buffers for use on more active SCSI-Flows.

The techniques of the present invention can be implemented on a variety of network devices such as fibre channel switches and routers. In one example, the techniques of the present invention can be implemented on the MDS 9000 series of fibre channel switches available from Cisco Systems of San Jose, Calif.

Figure 7:
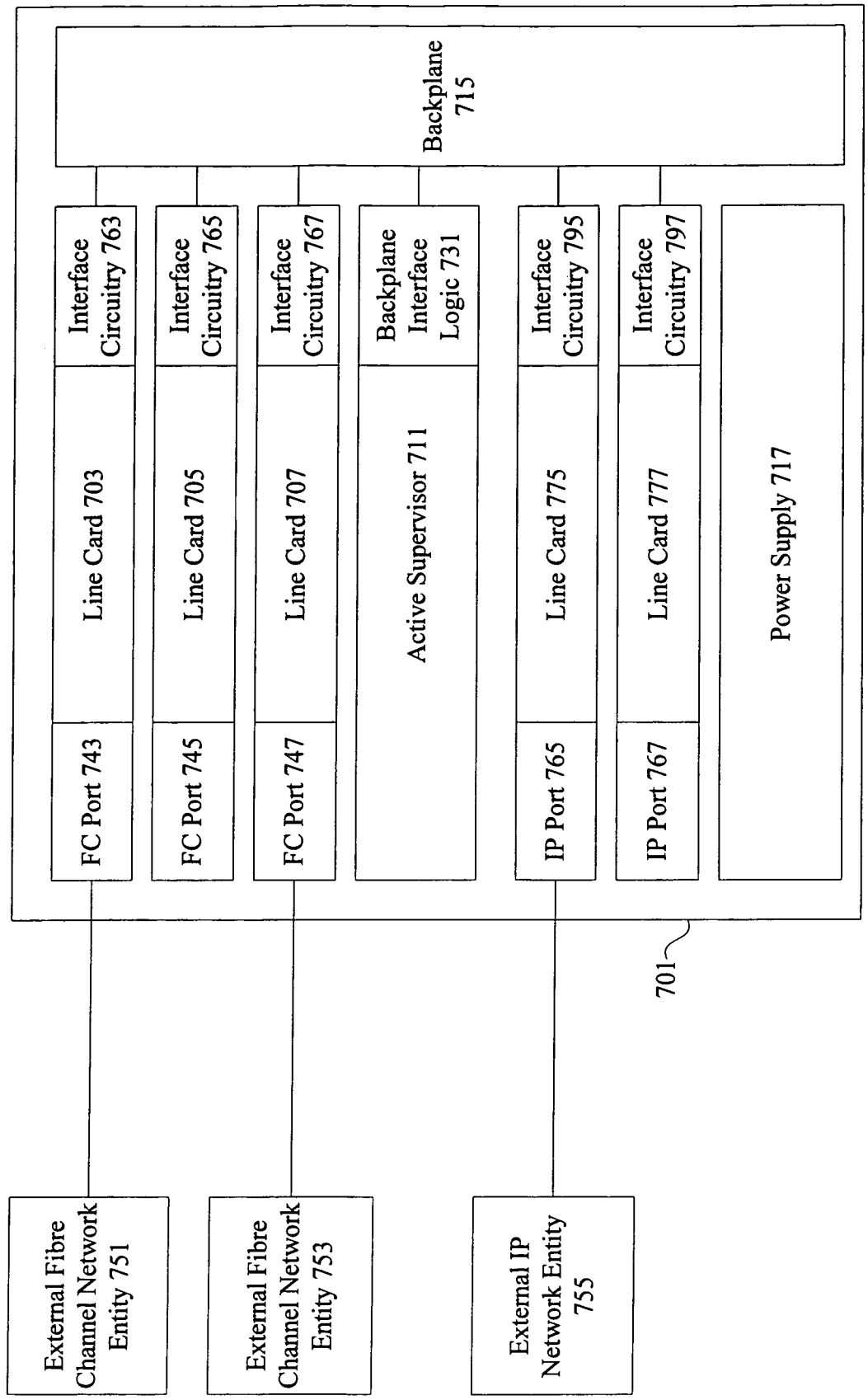
FIG. 7 is a diagrammatic representation showing one example of a fibre channel switch.

FIG. 7 is a diagrammatic representation of one example of a fibre channel switch that can be used to implement techniques of the present invention. Although one particular configuration will be described, it should be noted that a wide variety of switch and router configurations are available. The tunneling switch 701 may include one or more supervisors 711. According to various embodiments, the supervisor 711 has its own processor, memory, and storage resources.

Line cards 703, 705, and 707 can communicate with an active supervisor 711 through interface circuitry 783, 785, and 787 and the backplane 715. According to various embodiments, the line cards 703, 705, and 707 are intelligent with data snooping, data path processing, and control path processing capabilities. According to various embodiments, each line card includes a plurality of ports that can act as either input ports or output ports for communication with external fibre channel network entities 751 and 753. The backplane 715 can provide a communications channel for all traffic between line cards and supervisors. Individual line cards 703 and 707 can also be coupled to external fibre channel network entities 751 and 753 through fibre channel ports 743 and 747.

External fibre channel network entities 751 and 753 can be nodes such as other fibre channel switches, disks, RAIDS, tape libraries, or servers. It should be noted that the switch can support any number of line cards and supervisors. In the embodiment shown, only a single supervisor is connected to the backplane 715 and the single supervisor communicates with many different line cards. The active supervisor 711 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

According to various embodiments, the switch also includes line cards 775 and 777 with IP interfaces 765 and 767. In one example, the IP port 765 is coupled to an external IP network entity 755. The line cards 775 and 777 can also be coupled to the backplane 715 through interface circuitry 795 and 797.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A storage area network device, comprising:
    a host intelligent port connected to a host configured to snoop a command frame from the host, the host intelligent port configured to determine flow information and support data transfer acceleration; and
    one or more processors configured to identify a flow between the host and a target based on the snooped command frame and determine that the target is associated with a target intelligent port that supports data transfer acceleration and has acceleration enabled, the target intelligent port associated with another storage area network device and the target intelligent port connected to the target;
    wherein the storage area network device is configured to enable acceleration between the host and the target by preemptively responding to the host with a transfer ready message when the host sends a data transfer request to the target.

2. The storage area network device of claim 1, wherein the host intelligent port responds to the host as a proxy for the target.

3. The storage area network device of claim 1, wherein the target is associated with the target intelligent port.

4. The storage area network device of claim 3, wherein the target intelligent port responds to the target as a proxy for the host.

5. The storage area network device of claim 1, wherein the host intelligent port forwards the data transfer request to the target intelligent port upon preemptively responding to the host.

6. The storage area network device of claim 5, wherein the host intelligent port preemptively responds to the host if the host intelligent port locates sufficient buffer space to receive data frames associated with the data transfer request.

7. The storage area network device of claim 6, wherein the host intelligent port and the target intelligent port manage buffer space for data transfers.

8. The storage area network device of claim 1, wherein acceleration is enabled by entering the host and target pair into a forwarding lookup table.

9. The storage area network device of claim 8, wherein the forwarding lookup table is a ternary content addressable memory (TCAM) table.

10. The storage area network device of claim 9, wherein the TCAM table includes multiple fields with wildcard entries to trap frames going through the intelligent port.

11. A method for accelerating storage area network data transfers, the method comprising:
- at a host intelligent port associated with a storage area network edge switch, the host intelligent port connected to a host, snooping a command frame from the host, wherein the host intelligent port is configured to determine flow information and support data transfer acceleration;
- identifying a flow between the host and a target based on the snooped command frame;
- determining at the storage area network edge switch that the target is associated with a target intelligent port that supports data transfer acceleration and has acceleration enabled, the target intelligent port associated with another storage area network edge switch and the target intelligent port connected to the target; and
- enabling at the storage area network edge switch accelerated data transfer between the host and the target by preemptively responding to the host with a transfer ready message when the host sends a data transfer request to the target.

12. The method of claim 11, wherein the host intelligent port responds to the host as a proxy for the target.

13. The method of claim 11, wherein the target is associated with the target intelligent port and wherein after the target intelligent port detects the command frame coming from the host, the target intelligent port determines the location and type of the host intelligent port and determines whether the host intelligent port is configured to determine flow information and support accelerated data transfer.

14. The method of claim 13, wherein the target intelligent port responds to the target as a proxy for the host and wherein if the target intelligent port does not have acceleration enabled, the host intelligent port attempts to enable acceleration at the target intelligent port.

15. The method of claim 11, wherein the host intelligent port forwards the data transfer request to the target intelligent port upon preemptively responding to the host.

16. The method of claim 15, wherein the host intelligent port preemptively responds to the host if the host intelligent port locates sufficient buffer space to receive data frames associated with the data transfer request.

17. The method of claim 16, wherein the host intelligent port and the target intelligent port manage buffer space for data transfers.

18. The method of claim 11, wherein acceleration is enabled by entering the host and target pair into a forwarding lookup table.

19. The method of claim 18, wherein the forwarding lookup table is a ternary content addressable memory (TCAM) table.

20. The method of claim 19, wherein the TCAM table includes multiple fields with wildcard entries to trap frames going through the intelligent port.

21. A system for accelerating storage area network data transfers, the system comprising:
- means for snooping a command frame from a host at a host intelligent port associated with a storage area network edge switch, the host intelligent port connected to the host, and the host intelligent port configured to determine flow information and support data transfer acceleration;
- means for identifying a flow between the host and a target based on the snooped command frame;
- means for determining at the storage area network edge switch that the target is associated with a target intelligent port that supports data transfer acceleration and has acceleration enabled, the target intelligent port associated with another storage area network edge switch and the target intelligent port connected to the target; and
- means for enabling at the storage area network edge switch accelerated data transfer between the host and the target by preemptively responding to the host with a transfer ready message when the host sends a data transfer request to the target.

* * * * *